United States Patent
Contet et al.

(10) Patent No.: US 9,740,024 B2
(45) Date of Patent: *Aug. 22, 2017

(54) PAIR OF PROGRESSIVE OPHTHAMLIC LENSES

(71) Applicant: ESSILOR INTERNATIONAL (COMPAGNIE GENERALE D'OPTIQUE), Charenton-le-Pont (FR)

(72) Inventors: Aude Contet, Charenton-le-Pont (FR); Helene De Rossi, Charenton-le-Pont (FR); Benedicte Deldalle, Charenton-le-Pont (FR); Cyril Guilloux, Charenton-le-Pont (FR); Farid Karioty, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/767,769

(22) PCT Filed: Feb. 12, 2014

(86) PCT No.: PCT/EP2014/052695
§ 371 (c)(1),
(2) Date: Aug. 13, 2015

(87) PCT Pub. No.: WO2014/128033
PCT Pub. Date: Aug. 28, 2014

(65) Prior Publication Data
US 2015/0378173 A1    Dec. 31, 2015

(30) Foreign Application Priority Data
Feb. 20, 2013    (EP) .................................. 13305192

(51) Int. Cl.
G02C 7/02    (2006.01)
G02C 7/06    (2006.01)

(52) U.S. Cl.
CPC ............. G02C 7/027 (2013.01); G02C 7/024 (2013.01); G02C 7/028 (2013.01); G02C 7/061 (2013.01);
(Continued)

(58) Field of Classification Search
CPC ........ G02C 7/061; G02C 7/065; G02C 7/066; G02C 7/024; G02C 7/027; G02C 7/028; G02C 7/063
(Continued)

(56) References Cited

U.S. PATENT DOCUMENTS 5,812,238 A    9/1998  Ahsbahs et al.
7,083,277 B2   8/2006  Esser et al.
(Continued)

FOREIGN PATENT DOCUMENTS

EP    2 224 276 A1    9/2010
FR    2 704 327 A1    10/1994
(Continued)

OTHER PUBLICATIONS

International Search Report, dated May 19, 2014, from corresponding PCT Application.
(Continued)

*Primary Examiner* — Jordan Schwartz
(74) *Attorney, Agent, or Firm* — Young & Thompson

(57) ABSTRACT

A pair of progressive ophthalmic lenses (1, 2) meets special conditions for improving binocular vision of a wearer, while avoiding discomfort for peripheral vision. A first one of the conditions relates to width values of far vision fields and/or proximate vision fields, for indicating that the fields are different enough in width between both lenses. A second one (Continued)

of the conditions sets a maximum value for the relative difference in mean refractive power gradient between both lenses.

3 Claims, 5 Drawing Sheets

(52) U.S. Cl.
CPC ............. *G02C 7/063* (2013.01); *G02C 7/065* (2013.01); *G02C 7/066* (2013.01); *G02C 7/068* (2013.01)

(58) Field of Classification Search
USPC .............. 351/159.06, 159.1, 159.16, 159.74, 351/159.75
See application file for complete search history.

(56) References Cited

U.S. PATENT DOCUMENTS

| | | | |
|---|---|---|---|
| 2007/0242217 A1 | 10/2007 | Carimalo et al. | |
| 2010/0097570 A1* | 4/2010 | Katzman | G02C 7/066 351/159.42 |
| 2011/0279773 A1 | 11/2011 | Drobe et al. | |
| 2014/0016088 A1* | 1/2014 | De Rossi | G02C 7/061 351/159.42 |
| 2014/0293216 A1* | 10/2014 | Muradore | G02C 7/028 351/159.42 |
| 2015/0103312 A1* | 4/2015 | Paille | G02C 7/025 351/204 |
| 2015/0109575 A1* | 4/2015 | Drobe | G02C 7/027 351/159.42 |
| 2015/0124214 A1* | 5/2015 | Contet | G02C 7/027 351/204 |
| 2015/0146164 A1* | 5/2015 | Contet | G02C 7/027 351/159.42 |

FOREIGN PATENT DOCUMENTS

| | | |
|---|---|---|
| WO | 2006/000682 A1 | 1/2006 |
| WO | 2007/068819 A1 | 6/2007 |
| WO | 2011/061267 A1 | 5/2011 |

OTHER PUBLICATIONS

European Search Report, dated Jun. 24, 2013, from corresponding European Application.
"Evolis," Jun. 19, 2013, retrieved from the Internet: URL:https://www.bbgr.com/en-us/produitsservices/verres/Progressives/Pages/Evolis.aspx.

\* cited by examiner

PAIR OF PROGRESSIVE OPHTHAMLIC LENSES

TECHNICAL FIELD OF THE INVENTION

The invention relates to a pair of progressive ophthalmic lenses, and to a method for providing such lens pair to a wearer.

In the context of the present invention, a pair of ophthalmic lenses means two eyeglasses which are intended to be provided to one and same wearer when both eyeglasses are mounted into one spectacle frame. Each lens of the pair is therefore dedicated to correcting both an ametropia and a presbyopia of one of the wearer's eyes in accordance to an ophthalmic prescription obtained for this eye. Visions of both right and left eyes are thus corrected simultaneously.

The invention specifically relates to provide improved binocular vision to the wearer, by selecting appropriately the progressive lenses to be paired.

BACKGROUND OF THE INVENTION

Progressive ophthalmic lenses allow sharp vision of objects which are located at varying distances in front of the lens wearer, the wearer being presbyopic. For this purpose, each progressive ophthalmic lens has a mean refractive power which varies along a meridian line of the lens. Here, the meridian line corresponds to the main gaze direction used by the wearer to see at varying distances. The vision distances may be defined by using an ergorama. As a general rule, the vision distance decreases from more than 2 meters for a far vision gaze direction, to about 40 centimeters for a proximate vision gaze direction which is oriented below the far vision gaze direction.

But out of the meridian line, a progressive ophthalmic lens has mean refractive power values and resultant astigmatism values which are not equal to those on the meridian line at constant height value for the gaze direction lowering angle. As a consequence, the optical powers which are actually produced by each lens do not match exactly the prescription out of the meridian line and out of lens zones dedicated respectively to far vision and proximate vision. Many efforts have been spent for years to increase the far- and/or proximate vision areas in combination with reducing the correction deviations out of these areas and the meridian line. But these improvements relate in optimizing each lens separately.

In addition, it has been discovered that the wearer's binocular vision can be improved by selecting appropriately both lenses which pertain to one and same pair, each with a different lens design. For example, document FR 2 704 327 proposes selecting one of the ophthalmic progressive lenses of the pair with a large far vision zone, and the other ophthalmic progressive lens of the pair with a large proximate vision zone. As a consequence, the lens with large far vision zone has a reduced proximate vision zone, and the one with large proximate vision zone has a reduced far vision zone. But binocular vision allows the wearer to select the one of his eyes which has sharper vision for each binocular gaze direction. Thus, each of the largest far- and proximate vision zones between both lenses appears to be actually effective for providing sharp binocular vision, whereas the smallest far- and proximate vision zones are useful for providing stereoscopic vision perception.

U.S. Pat. No. 7,083,277 discloses another example of lens pair with both lenses being different in far- and proximate vision field widths.

However, vision discomfort may still arise when both lenses of the pair are thus selected with different designs. In particular, such discomfort relates to peripheral gaze directions with respect to the meridian lines of the lenses.

Starting from this situation, an object of the present invention consists in improving binocular vision of a wearer of ophthalmic progressive lenses, while avoiding discomfort for peripheral vision.

SUMMARY OF THE INVENTION

For meeting this object or others, the present invention proposes a pair of progressive ophthalmic lenses, in which each lens has a prescribed addition ADD which is common to both lenses of the pair and, in as-worn conditions of the lens by a wearer, a meridian line, a nasal side and a temporal side on either side of the meridian line, respectively, a fitting cross, a prism reference point, a proximate vision gaze direction, a mean refractive power $PPO_{\alpha,\beta}$ and a module of resulting astigmatism $ASR_{\alpha,\beta}$ for each gaze direction through the lens and corresponding to a lowering angle $\alpha$ and an azimuth angle $\beta$, relating to a cyclopean coordinate system.

For each progressive lens of the pair, a mean refractive power deviation $DPPO_{\alpha,\beta}$ is defined for each gaze direction through this lens as follows, separately from the other lens of the pair:

$$DPPO_{\alpha,\beta} = PPO_{\alpha,\beta} - PPO_{\alpha,\beta meridian},$$

where $PPO_{\alpha,\beta meridian}$ is the mean refractive power on the meridian line for the same lowering angle value $\alpha$ than the gaze direction considered. The meridian line ML corresponds to the main gaze direction used by the wearer to see at varying distances. Then and again for each lens separately, a total deviation $P_{\alpha,\beta}$ is further defined for each gaze direction through this lens as:

$$P_{\alpha,\beta} = m^*(DPPO_{\alpha,\beta})^a + n^*(ASR_{\alpha,\beta})^b,$$

where m, n, a and b are parameters such that m≥0, n≥0, (m, n)≠(0, 0), 0<a≤2 and 0<b≤2. For each lens, such total deviation quantifies the difference between the actual optical power which is produced at a given direction and corresponding optical powers selected from the meridian line of the lens for the same height. Thus, the m-, n-, a- and b-parameters are selected initially for allowing the total deviation $P_{\alpha,\beta}$ to be calculated for each gaze direction. The values selected for these m-, n-, a- and b-parameters are constant for all features relating to the lens pair considered. In particular, they are constant whatever the gaze direction for which the total deviation is calculated.

A first width value is also defined for each lens separately as the angular distance between first and second gaze directions respectively on the nasal and temporal sides of the lens, both first and second gaze directions with lowering angle $\alpha$ equal to that of a gaze direction through the fitting cross, and each where the total deviation $P_{\alpha,\beta}$ satisfies:

$$P_{\alpha,\beta} = m^*(ADD/8)^a + n^*(ADD/4)^b.$$

Such first width value quantifies the horizontal spread of the far vision area of each lens of the pair, from nasal side to temporal side. Thus, $m^*(ADD/8)^a + n^*(ADD/4)^b$ is a reference value for the total deviation $P_{\alpha,\beta}$, which is used for defining the first width value, when the total deviation $P_{\alpha,\beta}$ is calculated as above-indicated using the selected values for the m-, n-, a- and b-parameters, for any gaze direction.

A second width value is also defined for each lens separately as the angular distance between third and fourth gaze directions respectively on the nasal and temporal sides of the lens, both third and fourth gaze directions with lowering angle α equal to that of the proximate vision gaze direction, and each where the total deviation $P_{\alpha,\beta}$ satisfies:

$$P_{\alpha,\beta}=m*(ADD/4)^a+n*(ADD/2)^b.$$

Such second width value similarly quantifies the horizontal spread of the proximate vision area of each lens of the pair, from nasal side to temporal side. So $m*(ADD/4)^a+n*(ADD/2)^b$ is the reference value for the total deviation $P_{\alpha,\beta}$, which is used for defining the second width value. It is different from the reference value used for the first width value.

A total horizontal width ratio is further defined for the pair of lenses as the relative difference between the respective first width values of both lenses of the pair, or between the respective second width values of both lenses of the pair. According to a first feature of the invention, this total horizontal width ratio is greater than or equal to 0.10 in absolute value. This first feature sets a minimum threshold for the difference in width of far vision zone or proximate vision zone between both lenses of the pair. Thus, a large sharp vision zone for one of the two eyes is provided to the wearer for far- and proximate vision that provides to the wearer large perceived field of vision for each vision zone in binocular vision.

Each lens separately also has a maximum mean refractive power gradient produced for a gaze direction corresponding to a cyclopean gaze direction which is comprised:
inside a zone centered on to the cyclopean gaze direction corresponding to gaze directions passing through the PRP and containing all cyclopean gaze directions (α,β) respecting the following inequality $(|\alpha|^2+|\beta|^2)^{1/2}\leq 40°$, and
outside a central optical zone; the central optical zone comprising a main line ML_min ($\alpha_{min}$, $\beta_{min}$) of cyclopean directions for which, for each angle $\alpha_{min}$, the resulting astigmatism reaches its minimum, the central optical zone being delimited on either side of the main line by cyclopean gaze directions whose azimuth angle is equal to $\beta_{min}\pm 5°$.

Then, according to a second feature of the invention, a relative difference in the maximum mean refractive power gradient between both lenses of the pair is less than or equal to 0.08 in absolute value. This second feature sets a threshold condition relating to the mean refractive power gradient, for both lenses not to have respective designs in peripheral part which are too different from each other, which can cause discomfort to the wearer. In particular, it avoids assigning a lens with hard design to one of the wearer's eyes together with another lens with soft design to the other one of the wearer's eyes.

Hence, the invention consists in an advantageous combination of two features which provide an improved binocular vision by using a specially selected progressive lens pair, while ensuring comfort in peripheral vision.

In the context of the invention, the cyclopean coordinate system denotes any coordinate system suitable for identifying a gaze direction which is originating from one point located between both eyes of the wearer, and which is oriented towards an object currently looked at by the wearer. Such direction is called cyclopean gaze direction, and separate gaze directions respectively for both eyes can be derived from the cyclopean gaze direction. But, when characterizing a lens pair according to the invention without a wearer of these lenses being individually identified, the cyclopean coordinate system to be used is defined by a separation distance which is equal to 64 mm (millimeter) between both pupils of a standard wearer, and for a cyclopean eye which is located at mid position between both eyes of this standard wearer.

Also in the context of the invention, the relative difference between any two values denotes the ratio of the difference between these values over the sum of the same values. Thus, if X and Y denote both values considered, then their relative difference is Ratio=(X−Y)/(X+Y).

The lenses may further have nasal and temporal half-widths defined in the following manner for each lens separately:
first nasal and temporal half-widths defined as the angular distances from the gaze direction through the fitting cross respectively to the first gaze direction and to the second gaze direction; and
second nasal and temporal half-widths defined as the angular distances from the proximate vision gaze direction respectively to the third gaze direction and to the fourth gaze direction.

Hence, the first nasal half-width relates to the spread of the far vision zone on nasal side, the first temporal half-width relates to the spread of the far vision zone on temporal side, the second nasal half-width relates to the spread of the proximate vision zone on nasal side, and the second temporal half-width relates to the spread of the proximate vision zone on temporal side.

According to a first optional improvement of the invention, each lens of the pair may have a relative difference between the first nasal and temporal half-widths of this lens, which is lower than or equal to 0.15 in absolute value, or a relative difference between the second nasal and temporal half-widths of this lens, which is lower than or equal to 0.05 in absolute value, or both relative differences lower than or equal to 0.15 and 0.05 respectively for the first half-widths and the second half-widths. This optional condition relates to each lens of the pair separately from the other lens, and means that at least one of the far vision field and the proximate vision field of this lens extends nearly symmetrically from the meridian line. Thus the wearer benefits of a homogenous peripheral vision regarding nasal and temporal parts, and can have similar behaviours towards both right and left sides so as to turn his head and/or his eyes for viewing sharply an object which is offset laterally. Preferably, the relative difference between the first nasal and temporal half-widths may be lower than or equal to 0.12 in absolute value, and/or the relative difference between the second nasal and temporal half-widths may be lower than or equal 0.03 in absolute value, or both, for each lens of the pair.

According to a second optional improvement of the invention, the lens pair may be such that a relative difference in the first width value between both lenses of the pair has an opposite sign to a relative difference in the second width value between both lenses, for a same lens order in these relative differences respectively for the first width values and the second width values. Hence, optimum combination of both lenses can be obtained for providing the wearer with wide horizontal spread of sharp binocular vision, for both far and proximate objects that are looked at.

The following parameter values may be used for determining either the first and second gaze directions, or the third and fourth gaze directions, or all first to fourth gaze directions, in alternative embodiments of the invention:
m=0, n=1 and b=1, so that the criterion for determining the width values is based on the resulting astigmatism only;

m=1, n=0 and a=1, so that the criterion for determining the width values is based on the mean refractive power deviation only; or m=4, n=2, a=2 and b=2, so that the criterion for determining the width values is that of Y. Le Grand as disclosed in the article entitled "Sur le calcul des verres de lunetterie", Revue d'Optique, Paris, 1966.

The invention may be advantageously applied when an absolute difference in prescribed far vision mean refractive power between both lenses is less than or equal to 1.0 diopter. Out of these cases, optical aberrations as power deviation or resulting astigmatism may not be fully mastered as for each vision zones, so that the design differences between both lenses as provided by the present invention can fully appear.

Similarly, the invention may be advantageously applied when an absolute difference in prescribed astigmatism value between both lenses is less than or equal to 1.0 diopter.

The present invention also proposes a method for providing a pair of progressive ophthalmic lenses to an identified wearer, which method comprises the following steps:

/1/ for the wearer to whom both lenses are dedicated:
  obtaining the prescriptions for both eyes including the prescribed addition ADD which is common to both lenses of the pair;
  obtaining a value for a separation distance between both pupils of the wearer, and a position of a cyclopean eye for this wearer; and
  defining a cyclopean coordinate system for the wearer, based on the pupil separation distance and the cyclopean eye position;

/2/ for each lens of the pair separately from the other lens, defining as above the total deviation for each gaze direction through this lens, and obtaining the first and second width values, and the maximum mean refractive power gradient for this lens;

/3/ for the lens pair, defining the total horizontal width ratio and the relative difference in the maximum mean refractive power gradient between both lenses of the pair;

/4/ optimizing at least one lens of the pair so that the total horizontal width ratio has an absolute value greater than or equal to 0.10, and the relative difference in the maximum mean refractive power gradient between both lenses is less than or equal to 0.08 in absolute value; and /5/ manufacturing both lenses of the pair in accordance with an optimization result of step /4/.

The values for the m-, n-, a- and b-parameters are selected initially when implementing the invention method, and are kept constant thereafter all along the execution of the method. In particular, these values are re-used without change when calculating the total deviation $P_{\alpha,\beta}$ for any gaze direction. When the first and second widths are preferred to be based on the resulting astigmatism only, then the m-parameter equals zero, and the n- and b-parameters both equal unity.

Conveniently, the optimizing process of step /4/ may be implemented using computer means.

In some implementations of a method of the invention, step /4/ may be based on data linked to the wearer. These data linked to the wearer may be obtained themselves before step /4/, for example at a same time as step /1/ is carried out.

For a lens pair or a method according to the invention, the total horizontal width ratio may have an absolute value greater than or equal to 0.15. In combination or independently, the relative difference in the maximum mean refractive power gradient between both lenses may be less than or equal to 0.04 in absolute value.

BRIEF DESCRIPTION OF THE DRAWINGS

These and other features and advantages of the invention will become apparent from the detailed specification below, which is provided only for illustration purpose without inducing any limitation, and based on the appended drawings now listed.

Same notations used in different ones of these figures have same meanings.

DETAILED DESCRIPTION OF THE INVENTION

Figure 1A:
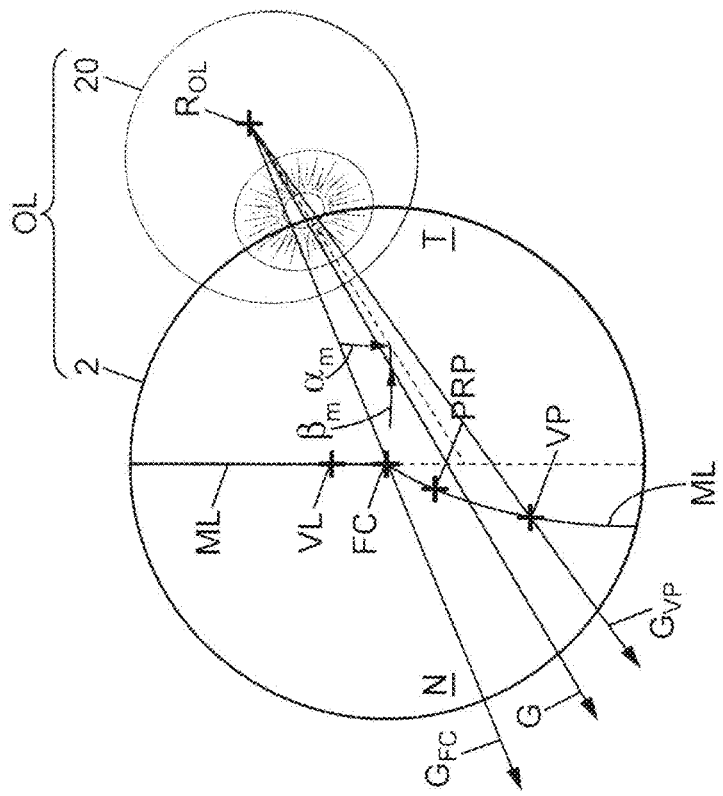
FIGS. 1a to 1c illustrate optical parameters related to a lens pair according to the invention.
Figure 1A:
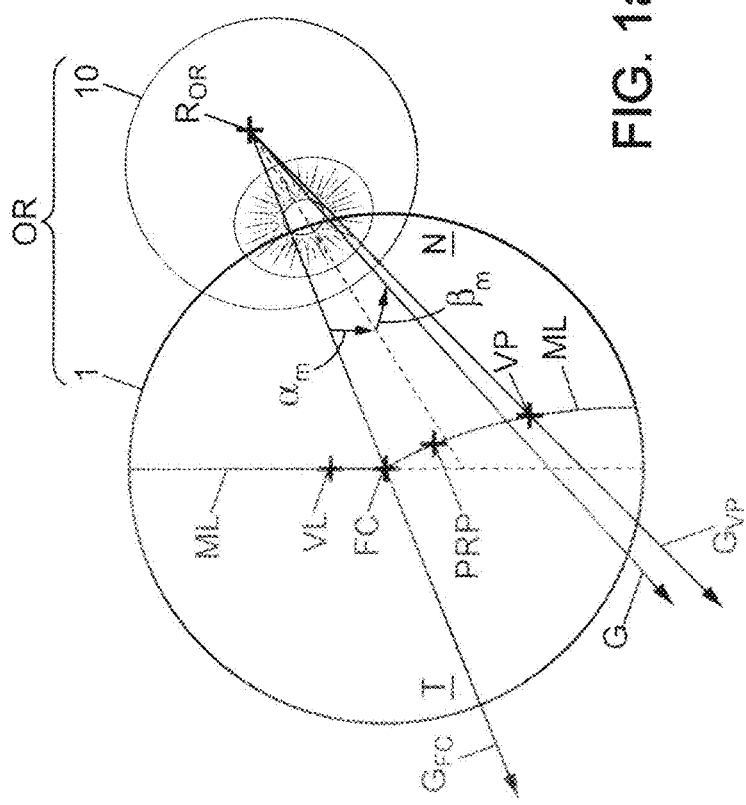
Figure 1B:
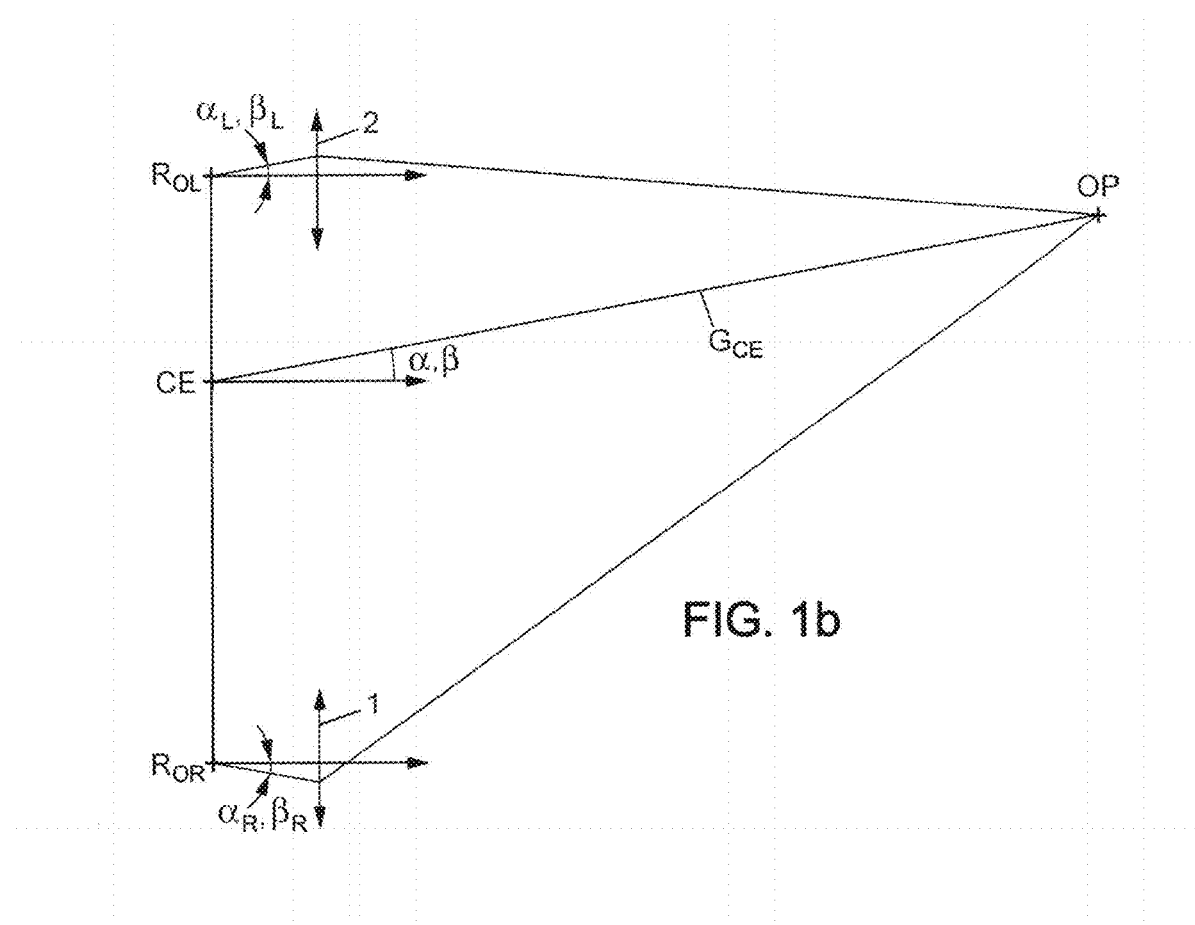
Figure 1C:
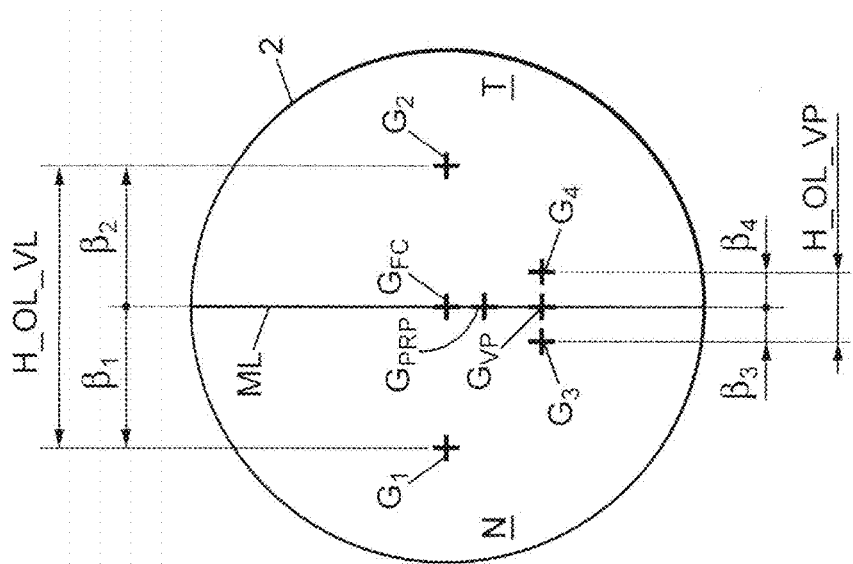
Figure 1C:
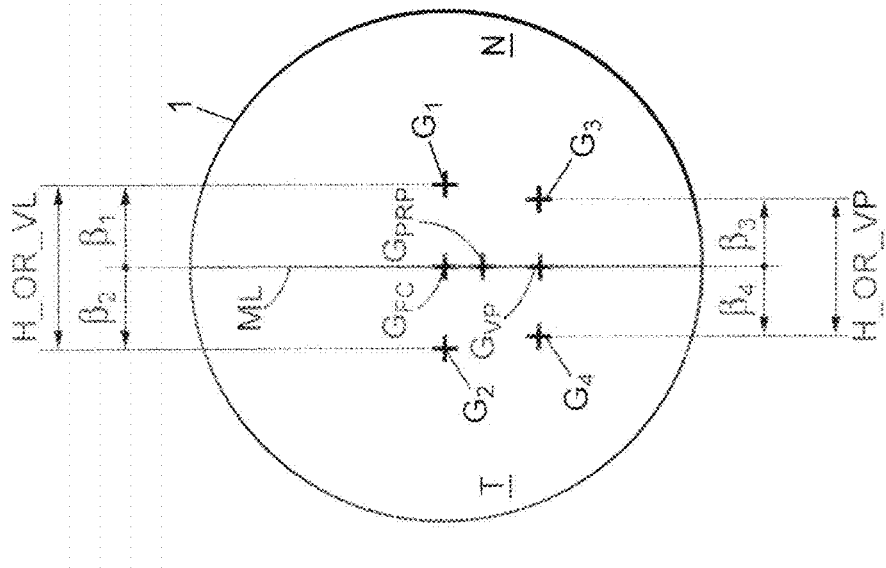

FIG. 1a is a perspective view representing both lenses of a pair in as-worn conditions for a wearer, and FIG. 1c is a planar view of the lenses with parameters relating to the cyclopean coordinate system.

In FIG. 1a, reference OR denotes the right eye 10 of the wearer equipped with the lens 1, and reference OL denotes the left eye 20 of the same wearer equipped with the lens 2. Hence, both lenses 1 and 2 are worn simultaneously by the wearer to provide him a corrected binocular vision.

The wearing conditions for both lenses 1 and 2 may be the usual ones which are known in the art. In particular, both lenses 1 and 2 are mounted together within a spectacle frame (not shown) so that the back surface of each lens may be located at a distance of about 25.5 mm (millimeter) from the rotation center of the corresponding eye. $R_{OR}$ and $R_{OL}$ denote respectively the rotation centers of the eyes 10 and 20. The pantoscopic angle for each lens 1 and 2 may be 8° (degree), with each lens top edge leaned ahead with respect to the wearer's face. The wrap angle of each lens 1 and 2 may have a mean value of about 5°, this angle corresponding to a tilt of each lens about a vertical axis so that the temporal edge of the lens is shifted backwards with respect to its nasal edge.

Progressive lenses comprise micro-markings that have been made mandatory by a harmonized standard ISO 8980-2 published on 2004 Feb. 1 (ISO 8980-2:2004). Temporary markings may also be applied on the surface of the lens, indicating positions of control points on the lens, such as a control point for far vision, a control point for near vision, a prism reference point PRP and a fitting cross FC for instance. If the temporary markings are absent or have been erased, it is always possible to a skilled person to locate the control points on the lens by using a mounting chart and the permanent micro-markings. Indeed, item 7.1 c) of the standard ISO 8980-2 specifies that the manufacturer's name must be permanently indicated on the progressive addition lens, and item 8.1 of the same standard ISO 8980-2 indicates additional information which must be specified on the lens packaging or accompanying documents. It refers to Article 6 of ISO 14889:2003 for reciting this additional information or information which must be available on request to the lens manufacturer. This latter comprises lens alignment rules for recovering the locations of all reference points and measurement points which may be non-permanently marked on the lens, including the fitting cross, the prism reference point, the far vision control point, the proximate vision gaze direction (item 6.2 f) of ISO 14889 referring back to item 7.2 a) to e) of ISO 8980-2). Therefore, all these points are set unambiguously for any progressive ophthalmic lens, from the initial design and the manufacturing of this lens, and cannot be selected in a different way when examining this lens later.

The prism reference point PRP is considered here at the midpoint of the straight segment which connects the circle-like micro-markings. When the lens is mounted in front of the eye, the fitting cross is placed before the pupil or before the eye rotation center of the eye for a primary gaze direction. The primary gaze direction corresponds to the situation where a wearer is looking straight ahead. In the chosen frame, the fitting cross FC corresponds thus to a lowering angle $\alpha$ of 0° and an azimuth angle $\beta$ of 0°.

Then, each lens may be mounted within the spectacle frame so that the gaze direction of each eye 10, 20 passes through the fitting cross FC of the corresponding lens 1, 2 when the wearer is approximately looking horizontally at an object located in front of and far away from him, with the wearer's head itself approximately vertical. $G_{FC}$ denotes this gaze direction, which is commonly called primary gaze direction. Additionally for each one of the lenses 1, 2, $G_{PRP}$ denotes the gaze direction which passes through the prism reference point PRP of this lens.

N and T denote respectively the nasal side and the temporal side of each lens 1, 2. Both nasal and temporal sides are separated from each other by a meridian line ML within each lens. Within each lens, the meridian line ML is the track of the gaze direction of the corresponding eye when the wearer is looking successively at objects located at varying distances in front of him, as defined by an ergorama. To determine this meridian line ML by ray tracing, one can consider that for each gaze direction, the wearer is looking at an object located at the distance given by the ergorama and contained in the sagittal plane of the wearer. Usually, manufacturers will match this meridian line ML of an ophthalmic lens with approximately the line ML_min containing the gaze directions that corresponds to the minimum of resulting astigmatism or the line located at almost equal distance from two gaze directions through the lens respectively on the nasal side and the temporal side, with same values for the lowering angle and also same values for the resulting astigmatism. According to the monocular coordinate system, each meridian line ML or each line ML_min are contained in a vertical plane above the fitting cross FC, and deflected towards the nasal side N below the fitting cross FC. According to the cyclopean coordinate system, the meridian line ML is contained in a vertical plane for each lens containing the fitting cross FC. The line ML_min is called main line for each lens.

Each lens 1, 2 is selected based on a prescription obtained for the wearer and indicating a prescribed far vision mean refractive power $SPH\_M_{VL}$, a prescribed astigmatism value $CYL_{VL}$ and a prescribed addition ADD suitable for correcting the ametropia and presbyopia of each eye. The mean refractive power is obtained by summing the half value of the prescribed astigmatism to the prescribed sphere: $SPH\_M_{VL}=SPH_{VL}+CYL_{VL}/2$. For the present invention, the prescribed addition ADD is equal for both eyes 10 and 20. Then, the mean refractive power for each eye for proximate vision is obtained by summing the prescribed addition ADD to the far vision mean refractive power $SPH\_M_{VL}$ prescribed for the same eye: $SPH\_M_{VP}=SPH\_M_{VL}+ADD$. For each lens, the prescribed far vision mean refractive power $SPH\_M_{VL}$ is produced for a gaze direction intersecting the lens front surface at a far vision control point VL. For example, this far vision control point VL may be located so that the corresponding gaze direction is 8° above the gaze direction $G_{FC}$ within a common vertical plane.

Also for each lens 1, 2 separately, the calculated proximate vision mean refractive power $SPH\_M_{VP}$ is produced for a gaze direction for which the lowering angle is positive, that is to say below the fitting cross FC. For the invention implementations which are described here, a proximate vision gaze direction $G_{VP}$ is defined on the meridian line ML where the mean refractive power has reached 100% of the prescribed addition ADD, with respect to the prescribed far vision mean refractive power. Usually, for a regular progressive lens, 85% of the prescribed addition is reached between 22° and 26° from the fitting cross FC, and generally at 24° below the fitting cross FC, and 100% of the prescribed addition is reached between 34° and 38° from the fitting cross FC, and generally at 36° below the fitting cross FC. The intersection of $G_{VP}$ with the front surface is called the proximate vision point VP and does not necessarily match the proximate vision control point as indicated by the manufacturer of the lens.

Any gaze direction G through one of the lenses 1, 2 is originating from the rotation center $R_{OR}$ or $R_{OL}$ of the corresponding eye 10 or 20 respectively. It is identified using a lowering angle value $\alpha_m$ and an azimuth angle value $\beta_m$.

Actually, the lowering angle $\alpha_m$ and the azimuth angle $\beta_m$ as just defined relate to each lens separately, but do not suit for describing binocular vision and assessing binocular vision performances. So the above-defined angles $\alpha_m$ and $\beta_m$ which relate to monocular vision for each eye are to be replaced with a common angular system which defines the respective gaze directions of both eyes when operating together for binocular vision. FIG. 1b illustrates the definition of such system suitable for binocular vision, as known from WO 2011/061267 for example.

The rotation centers $R_{OL}$ and $R_{OR}$ of both eyes are represented as before, and a cyclopean eye denoted CE is defined on the straight segment which connects $R_{OL}$ and $R_{OR}$. The location of the cyclopean eye CE between both rotation centers $R_{OL}$ and $R_{OR}$ may be determined in several alternating manners. It may be at the middle position between $R_{OL}$ and $R_{OR}$, or shifted along this segment depending on the wearer. In particular, the Man skilled in ophthalmics knows methods for determining the location of the cyclopean eye CE from measurements performed on the wearer. Such a method may be based on the measurement of a dominance between the right eye 10 and the left eye 20. A dominance rate comprised between −1 and +1 may be determined for the wearer in this way. The cyclopean eye CE is then superposed with the right eye rotation center $R_{OR}$ when the measured value of the dominance rate equals −1, and it is superposed with the left eye rotation center $R_{OL}$ when the measured dominance rate equals +1. Then, for a measured value of the dominance rate which is intermediate between −1 and +1, the cyclopean eye CE is moved from $R_{OR}$ towards $R_{OL}$ proportionally to the measured value.

When the wearer is looking at an object point OP contained in his visual environment, a cyclopean gaze direction $G_{CE}$ connects the cyclopean eye CE to the object point OP. This cyclopean gaze direction $G_{CE}$ is identified itself using a lowering angle $\alpha$ and an azimuth angle $\beta$ defined as before but with the cyclopean eye CE used as the angle apex. Then, lowering angle values and azimuth angle values are defined for both eyes, respectively $\alpha_R$ and $\beta_R$ for the right eye 10 and $\alpha_L$ and $\beta_L$ for the left eye 20, corresponding to the respective gaze directions of the eyes when the wearer is looking at the object point OP through the lenses 1 and 2. Thus, the respective gaze directions of the eyes 10 and 20 for binocular vision are defined by the values of $\alpha$ and $\beta$ relating to the cyclopean gaze direction. These values are used for the maps of FIGS. 2a to 2d. According to the cyclopean coordinate system, gaze directions which are oriented downwards with respect to the fitting cross FC have positive values for the lowering angle $\alpha$, and gaze directions which are oriented towards the right side according to the point of view of the wearer with respect to the fitting cross FC or meridian line ML have negative values for the azimuth angle $\beta$. Both angles $\alpha$ and $\beta$ are zero for gaze direction $G_{FC}$.

Each lens 1, 2 is of progressive type for presbyopia-correction. Then it produces a mean refractive power $PPO_{\alpha,\beta}$ and a lens astigmatism $AST_{\alpha,\beta}$ which vary continuously depending on the gaze direction G through the lens. So the $PPO_{\alpha,\beta}$- and $AST_{\alpha,\beta}$-values vary as two functions of the $\alpha$- and $\beta$-angle values for each lens 1, 2. The resulting astigmatism $ASR_{\alpha,\beta}$ of one lens for any gaze direction G through this lens is the difference between the actual astigmatism value $AST_{\alpha,\beta}$ of the lens for this gaze direction and the prescribed astigmatism for the same lens. It is also commonly called unwanted astigmatism.

For each lens 1, 2 separately from the other lens, a mean refractive power deviation for each gaze direction $G(\alpha,\beta)$ through this lens is defined as follows:

$$DPPO_{\alpha,\beta} = PPO_{\alpha,\beta} - PPO_{\alpha,\beta meridian},$$

where $PPO_{\alpha,\beta meridian}$ is the mean refractive power on the meridian line ML of the lens for the value of the lowering angle $\alpha$. DPPO is thus calculated between the gaze direction G and the meridian line ML of the lens, at constant value for the lowering angle $\alpha$.

A total deviation combines the mean refractive power deviation and the resulting astigmatism for any gaze direction $G(\alpha, \beta)$ through one of the lenses, as follows:

$$P_{\alpha,\beta} = m*(DPPO_{\alpha,\beta})^a + n*(ASR_{\alpha,\beta})^b,$$

where m and n are fixed positive coefficients which can not be zero simultaneously, and a and b are exponents higher than zero and less than or equal to 2. The total deviation is also defined for each lens separately from the other one.

Then, two threshold values are defined for the total deviation based on the prescribed addition ADD, respectively for far vision and proximate vision. The threshold value for far vision is $m*(ADD/8)^a + n*(ADD/4)^b$, and that for proximate vision is $m*(ADD/4)^a + n*(ADD/2)^b$.

For each one of the lenses 1 and 2 independently, two gaze directions denoted $G_1$ and $G_2$ are defined both with the same value for the lowering angle $\alpha$ as the gaze direction $G_{FC}$, and where the total deviation is equal to the above-threshold for far vision. $\beta_1$ and $\beta_2$ are the respective azimuth angle values of the gaze directions $G_1$ and $G_2$. The absolute difference in the azimuth angle $\beta$ between the gaze directions $G_1$ and $G_2$, namely $ABS(\beta_2-\beta_1)$, is a measurement of the width of the far vision field of the lens of concern, and has been called first width value in the general part of the description. ABS stands for the absolute or unsigned value. In FIG. 1c, this first width value is denoted H_OR_VL for the right lens 1 and H_OL_VL for the left lens 2. In this notation, H stands for horizontal measurement direction, OR and OL stand respectively for right eye and left eye, and VL stands for far vision.

Similarly, two other gaze directions denoted $G_3$ and $G_4$ are further defined for each of the lenses 1 and 2 independently. They both have approximately the same value for the lowering angle $\alpha$ as the proximate vision gaze direction $G_{VP}$. The total deviation equals the threshold for proximate vision as defined above at the gaze directions $G_3$ and $G_4$. $\beta_3$ and $\beta_4$ are the respective azimuth angle values of the gaze directions $G_3$ and $G_4$. The absolute difference in azimuth angle $\beta$ between the gaze directions $G_3$ and $G_4$, $ABS(\beta_4-\beta_3)$, is a measurement of the width of the proximate vision field of the lens of concern. It has been called second width value in the general part of the description. In FIG. 1c, this second width value is denoted H_OR_VP for the right eye 1 and H_OL_VP for the left eye 2. In this notation, VP stands for proximate vision.

Gaze directions $G_1$ and $G_3$ are oriented towards the nasal side of each lens 1, 2, and gaze directions $G_2$ and $G_4$ towards their respective temporal side. All coordinates $\alpha_1$ to $\alpha_4$ and $\beta_1$ to $\beta_4$ relate to the cyclopean coordinate system.

The discrepancy in first width value between lenses 1 and 2 may be quantified using the following relative differences:

Ratio_H_VL=(H_OR_VL−H_OL_VL)/(H_OR_VL+H_OL_VL) for far vision, and

Ratio_H_VP=(H_OR_VP−H_OL_VP)/(H_OR_VP+H_OL_VP) for proximate vision.

In addition, the following meanings can be assigned:
$ABS(\beta_1)$ is the first nasal half-width for the right lens 1 or the left lens 2, denoted H_OR_VL_N or H_OL_VL_N respectively, and relates to far vision,
$ABS(\beta_2)$ is the first temporal half-width for the right lens 1 or the left lens 2, denoted H_OR_VL_T or H_OL_VL_T respectively, and relates to far vision too,
$ABS(\beta_3)$ is the second nasal half-width for the right lens 1 or the left lens 2, denoted H_OR_VP_N or H_OL_VP_N, but relates to proximate vision, and
$ABS(\beta_4)$ is the second temporal half-width for the right lens 1 or the left lens 2, denoted H_OR_VP_T or H_OL_VP_T, and relates to proximate vision again.

A discrepancy in the nasal and temporal half-widths can be quantified for each eye using the other following relative differences:

for the right lens 1 and for far vision: Ratio_H_OR_VL=(H_OR_VL_N−H_OR_VL_T)/(H_OR_VL_N+H_OR_VL_T)

for the right lens 1 and for proximate vision: Ratio_H_OR_VP=(H_OR_VP_N−H_OR_VP_T)/(H_OR_VP_N+H_OR_VP_T)

for the left lens 2 and for far vision: Ratio_H_OL_VL=(H_OL_VL_N−H_OL_VL_T)/(H_OL_VL_N+H_OL_VL_T)

for the left lens 2 and for proximate vision: Ratio_H_OL_VP=(H_OL_VP_N−H_OL_VP_T)/(H_OL_VP_N+H_OL_VP_T)

In the invention exemplifying embodiment characterized by the maps of FIGS. 2a to 2d, the prescribed far vision mean refractive power is −1.0 diopter for both right lens 1 and left lens 2. The prescribed addition ADD is 2.50 diopters for both lenses 1 and 2. This invention embodiment has been obtained by implementing computer means, in particular for the lens optimization step. Such optimization step is performed in a manner well-known in the art, using at least one merit function which quantifies a combination of deviations each between an actual value for one design parameter and a target value for this parameter. For implementing the invention, the total horizontal width ratio and possibly also the relative difference in the maximum mean refractive power gradient between both lenses may be handled each as one design parameter for the optimization step.

The formula used for the total deviation corresponds to m=0, n=1 and b=1, so that $P_{\alpha,\beta}=ASR_{\alpha,\beta}$.

The threshold condition for far vision which is met for the gaze directions $G_1$ and $G_2$ through each lens 1, 2 is therefore $ASR_{\alpha,\beta}=ADD/4=0.625$ diopter. Then from the maps of FIGS. 2c and 2d, the respective azimuth angle values $\beta_1$ and $\beta_2$ for the gaze directions $G_1$ and $G_2$ are:

for the right lens 1: $\beta_1=22.47°$ towards nasal side and $\beta_2=-29.61°$ towards temporal side for the left lens 2: $\beta_1=-14.5°$ towards nasal side and $\beta_2=16.78°$ towards temporal side Hence, H_OR_VL=52.08° for the right lens 1, and H_OL_VL=31.28° for the left lens 2, and the total horizontal width ratio Ratio_H_VL of the lens pair for far vision equals 0.25 in absolute value, which is more than 0.10.

The other threshold condition for proximate vision which is met for the gaze directions $G_3$ and $G_4$ through each lens 1, 2 is therefore $ASR_{\alpha,\beta}=ADD/2=1.25$ diopters. The proximate vision gaze direction $G_{VP}$ used is that one which crosses the meridian line ML of each lens 1, 2 and corresponds to a mean refractive power equal to the prescribed far vision mean refractive power increased by 100% of the prescribed addition ADD. Again from the maps of FIGS. 2c and 2d, the respective azimuth angle values $\beta_3$ and $\beta_4$ for the gaze directions $G_3$ and $G_4$ are:

for the right lens 1: $\beta_3=7.67°$ and $\beta_4=-11.66°$ for the left lens 2: $\beta_3=-11.13°$ and $\beta_4=15.63°$ Thus, H_OR_VP=19.33° for the right lens 1, and H_OL_VP=26.76° for the left lens 2, and the total horizontal width ratio Ratio_H_VP of the lens pair for proximate vision equals 0.16 in absolute value, which is greater than 0.10 again.

The relative difference between the first nasal and temporal half-widths for the right lens 1, denoted Ratio_H_OR_VL above, equals (H_OR_VL_N−H_OR_VL_T)/(H_OR_VL_N+H_OR_VL_T)=(22.47−29.61)/(22.47+29.61)=−0.137. And, the relative difference between the second nasal and temporal half-widths again for the right lens 1, noted Ratio_H_OR_VP, equals (H_OR_VP_N−H_OR_VP_T)/(H_OR_VP_N+H_OR_VP_T)=(7.67−11.66)/(7.67+11.66)=−0.206.

Similarly for the left lens 2, Ratio_H_OL_VL equals (H_OL_VL_N−H_OL_VL_T)/(H_OL_VL_N+H_OL_VL_T)=(14.50−16.78)/(14.50+16.78)=−0.073, and Ratio_H_OL_VP equals (H_OL_VP_N−H_OL_VP_T)/(H_OL_VP_N+H_OL_VP_T)=(11.13−15.63)/(11.13+15.63)=−0.168.

The ratios Ratio_H_OR_VL and Ratio_H_OL_VL are thus less than 0.15, in absolute values.

In addition for the current embodiment of the invention, the relative difference in the first width value between both lenses 1 and 2 of the pair, namely (H_OR_VL−H_OL_VL)/(H_OR_VL+H_OL_VL), is positive. Simultaneously, the relative difference in the second width value between both lenses 1 and 2 of the pair, namely (H_OR_VP−H_OL_VP)/(H_OR_VP+H_OL_VP), is negative, so that this latter is opposite in sign to the previous relative difference relating to first width values.

For each one of the lenses 1 and 2 separately, a channel is defined for each lens 1, 2 as the set of all gaze directions which are separated from the line ML_min by less than 5° in the azimuth angle β according to the cyclopean coordinate system. The side boundaries of the channel are indicated in broken lines in FIGS. 2a to 2d and the channel itself denoted CH.

A mean refractive power gradient is also calculated for each gaze direction G through any of the lenses 1 and 2 independently from the other lens. It is the module of the two-dimension vector with first component equal to the α-derivative of the mean refractive power, namely the derivative of $PPO_{\alpha,\beta}$ with respect to the lowering angle α, and second component equal to the β-derivative of the mean refractive power $PPO_{\alpha,\beta}$. Both derivatives are calculated for the same gaze direction G for obtaining the mean refractive power gradient relating to this gaze direction.

Then, a maximum mean refractive power gradient is determined for each one of the lenses 1 and 2 separately, outside the corresponding channel CH but with an angular distance of less than 40° from the gaze direction $G_{PRP}$. In the maps of FIGS. 2a to 2d, the circles denoted CC correspond to all gaze directions which are separated exactly by 40° in angular distance from the gaze direction $G_{PRP}$. Therefore, the maximum mean refractive power gradient is assessed for each one of the lenses 1 and 2 inside the circle CC but outside the channel CH. It can be denoted Max_Grad_$PPO_{\alpha,\beta}$_OR for the right lens 1 and Max_Grad_$PPO_{\alpha,\beta}$_OL for the left lens 2.

Figure 2B:
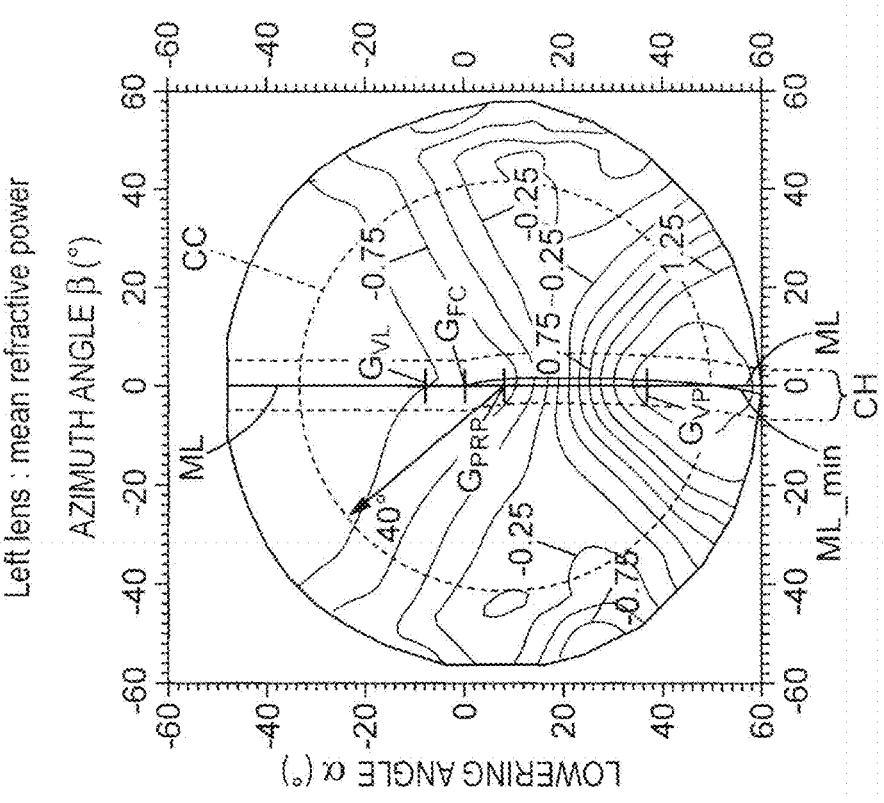
FIGS. 2a and 2b are mean refractive power maps respectively for a right lens and a left lens of a pair according to an embodiment of the invention.
Figure 2A:
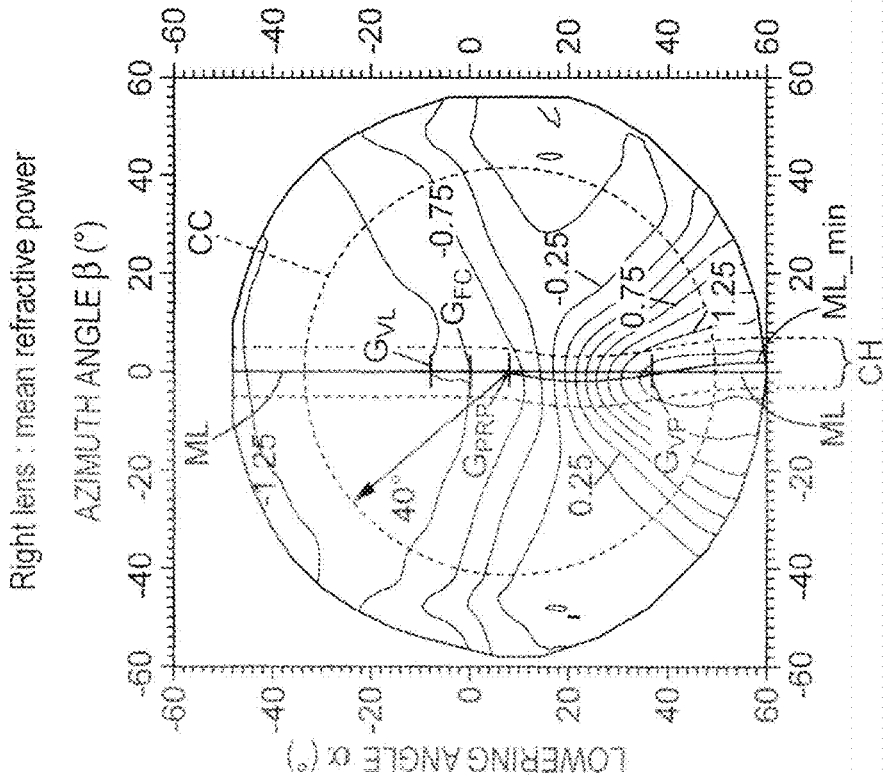
Figure 2D:
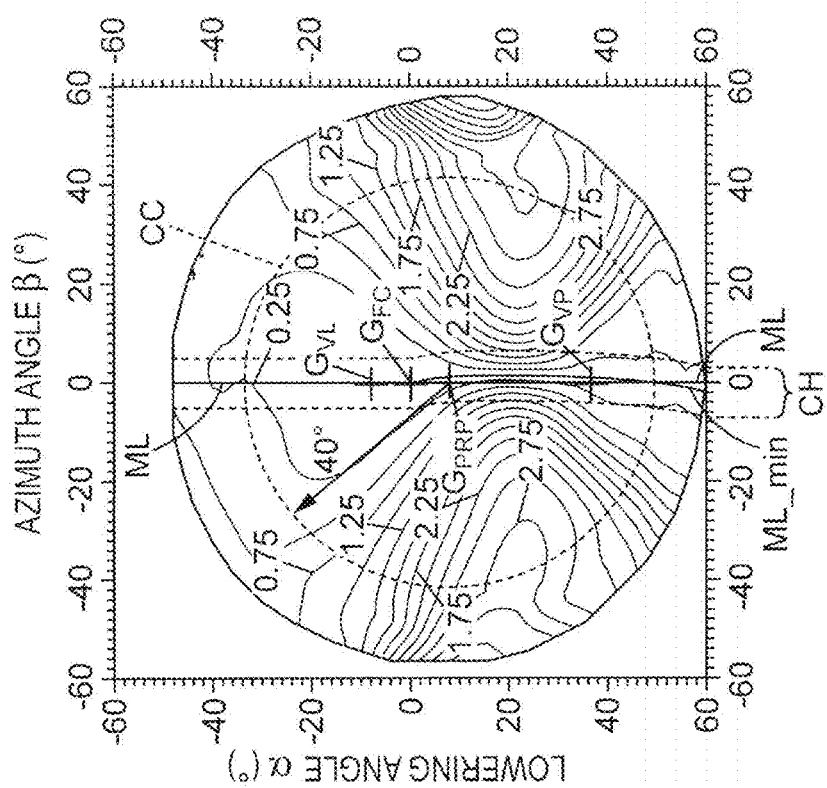
FIGS. 2c and 2d are maps of resulting astigmatism respectively for the right lens and the left lens of FIGS. 2a and 2b.
Figure 2C:
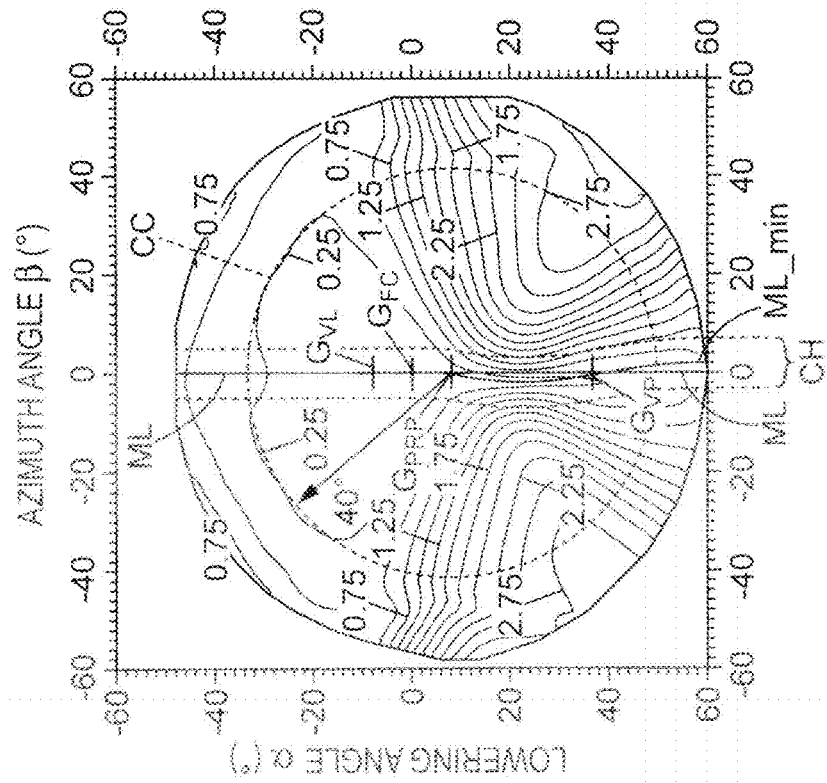

For lens 1 and from FIG. 2a, the maximum mean refractive power gradient Max_Grad_$PPO_{\alpha,\beta}$_OR, is 0.125 diopter/°, produced for α=−31° and β=6°.

For lens 2 and from FIG. 2b, the maximum mean refractive power gradient Max_Grad_$PPO_{\alpha,\beta}$_OL, is 0.113 diopter/°, produced for α=−23° and β=6°.

Therefore, the relative difference in the maximum mean refractive power gradient between both lenses 1 and 2, namely (Max_Grad_$PPO_{\alpha,\beta}$_OR−Max_Grad_$PPO_{\alpha,\beta}$_OL/(Max_Grad_$PPO_{\alpha,\beta}$_OR+Max_Grad_$PPO_{\alpha,\beta}$_OL), equals 0.05, thus less than 0.08 in absolute value.

A pair or progressive ophthalmic lenses according to the invention may be designed by optimizing at least one of the lenses 1 and 2 with respect to the total horizontal width ratio and the relative difference in the maximum mean refractive power gradient between both lenses. Furthermore, the optimizing step may take into account additional data such as data linked to the wearer.

In first design method implementations, the optimization step may comprise the following substeps:

obtaining at least one data linked to the wearer;

based on said data linked to the wearer, determining one of the wearer's eyes as a main eye or determining a value of a dominance rate for both eyes;

obtaining a relationship between a modulation parameter for the total horizontal width ratio and the main eye or value of the dominance rate; and performing the optimization using the modulation parameter for the total horizontal width ratio.

Data linked to the wearer means any data related to the wearer or a combination thereof, such as data linked to at least one eye of the wearer, data linked to optometric measurements carried out on the wearer or data linked to lifestyle, posture or handedness of the wearer.

In such first implementations, data linked to the eye means either one of the following data or any combination of several of them:

prescription data such as prescribed optical power, prescribed astigmatism with module and axis orientation, mean power also called mean sphere and equal to the prescribed optical power added to half of the prescribed astigmatism, prescribed prism with value and orientation, etc;

data related to the high order aberrations of the eye;

data related to the eye's biometry such as the position of the eye rotation center, the cornea, the pupil, or the pupil diameter;

binocular data related to the binocular behavior of both eyes, and allowing to identify one of the eyes as the main eye: which one of the eyes is the dominant one, the sighting one, the eye with the best acuity, the preferred eye, the eye with the highest or lowest amount of high order aberration, the eye which is more sensitive to blur and/or contrast, etc.

"Ocular dominance" is defined for example in the Dictionary of visual science, $4^{th}$ edition, D. Cline, H W Hofstetter, J R Griffin. "Visual acuity" refers to acuteness or clearness of vision, which depends in turn on the sharpness of the retinal focus within the eye and the sensitivity of the interpretative capability of the brain. "Blur sensitivity" represents the acuity loss produced by a defocus introduced in front of the eye. "Contrast sensitivity" refers to the ability to detect contrast, and may be determined by measuring the minimum contrast level which can be detected.

When data linked to the eye are used, one of the wearer's eyes may be determined as the main eye or a value of a dominance rate for both eyes may be determined.

When prescription data are used, the main eye may be that one of the eyes which has the lowest mean power value, in absolute value.

When binocular data are used, the main eye may be the dominant eye or that of the eyes which is more blur-sensitive or has better acuity.

Then, the lens with the largest value for the first width, namely the lens corresponding to the largest value among H_OR_VL and H_OL_VL, may be assigned to the main eye.

The modulation parameter may be a weight parameter used for the total horizontal width ratio in the merit function involved in the optimization process. Alternatively, it may be a distribution parameter of design targets.

The optimization step itself may be computer-implemented. But it may also involve a selection of a semi-finished blank for each eye, among blanks having respective designs different from each other but corresponding to the prescribed addition. Then, the face of each selected blank opposite to that provided with the desired design is machined so as to produce the optical power and astigmatism prescribed for the eye of concern.

When data linked to optometric measurements are used, one of the wearer's eyes may be determined as the main eye or a value of a dominance rate for both eyes may be determined.

Data linked to lifestyle of the wearer means data related to jobs and hobbies of the wearer. Different wearers, though, typically have different lens usage requirements, some of which being related to the wearer's vocational and avocational activities. Different vocational and avocational activities may encompass different ranges of accommodative demands due to, for example, variation in the working distance requirements of the activity and the nature and relative motion of the visual targets associated with the activity. Thus, different activities way warrant different considerations in the selection of an appropriate lens design. Data linked to lifestyle can be obtained by methods such as interviews and surveys at an optometrist, a store or the like.

When data linked to lifestyle are used, one of the wearer's eyes may be determined as the main eye or a value of a dominance rate for both eyes may be determined. Particularly, when data linked to lifestyle are segmented, one of the wearer's eye may be determined as the main eye. If data linked to lifestyle relate to a continuous criterion, a value of a dominance rate for both eyes may be determined. Data linked to lifestyle are advantageously used in combination with other data linked to the wearer, particularly data linked to posture or handedness.

Data linked to posture of the wearer means data related to positions and orientations of body parts (head, trunk, etc.) of the wearer to perform a task (reading, writing, watching computer screen, etc.) in determined environmental conditions (relative positions and orientations of objects). From posture adopted by an individual can derive knowledge of distances of object seen as a function of the gaze direction (ergorama).

When data linked to posture are used, one of the wearer's eyes may be determined as the main eye or a value of a dominance rate for both eyes may be determined. Particularly, when data linked to posture are segmented, for example if an object is seen either on the left side or on the right side of the sagittal plane of the wearer, one of the wearer's eye may be determined as the main eye. If data linked to posture relate to a continuous criterion, for example the distance from the object to the sagittal plane, a value of a dominance rate for both eyes may be determined.

When data linked to posture are used in combination with data linked to lifestyle, for example if the wearer mainly performs near vision tasks and if his posture is such that the objects seen in near vision are mainly on the right side of his sagittal plane, then the design of the right eye lens may be wider in near vision than that of the left eye lens.

Data linked to handedness of the wearer means data related to manual laterality, or laterality, of the wearer. Right-handed persons and left-handed persons behave very differently when executing certain near vision tasks. The specific near vision task of writing on a sheet of paper is usually considered for determining laterality. The laterality of a person can thus be defined by the hand used for writing on a sheet of paper, or more accurately, by calculating an handedness score consisting in asking questions about the hand used in everyday tasks. The Edinburgh Handedness Inventory is an example of such a way to determine an handedness score (Oldfield R. C. (1971), "The assessment and analysis of handedness: The Edinburgh Inventory", Neuropsychologia, vol. 9, p. 97-113).

When data linked to handedness are used, one of the wearer's eyes may be determined as the main eye.

When data linked to handedness are used in combination with data linked to lifestyle, for example if the wearer mainly performs near vision tasks and if he is right-handed, then the design of the right eye lens may be wider in near vision than that of the left eye lens.

In second design method implementations, the optimization step may comprise the following substeps:
  obtaining target designs respectively for both lenses of the pair;
  based on data linked to the wearer, determining one of the wearer's eyes as a main eye or determining a value of a dominance rate for both eyes;
  obtaining a relationship between a modulation parameter for the total horizontal width ratio and the main eye or value of the dominance rate;
  modifying the target designs using the modulation parameter for the total horizontal width ratio; and
  performing the optimization using the modified target designs.

The difference between the first and second design method implementations relates in the use of the modulation parameter during the optimization process itself for the first implementation, whereas it is used to define the optimization target for the second implementation.

The invention claimed is:

1. A method for providing a pair of progressive ophthalmic lenses to an identified wearer, said method comprising the following steps:

/1/ for the wearer of both lenses:
  obtaining the prescriptions for both eyes including a prescribed addition ADD for each of the two lenses, said prescribed addition being common to both lenses of the pair;
  obtaining a value for a separation distance between both pupils of the wearer, and a position of a cyclopean eye for the wearer; and
  defining a cyclopean coordinate system for the wearer, based on the pupil separation distance and the cyclopean eye position;

/2/ for each lens of the pair separately from the other lens:
  in standard as-worn conditions of the lens by the wearer, determining a meridian line, a nasal side and a temporal side on either side of the meridian line, respectively, a fitting cross, a prism reference point, a proximate vision gaze direction, a mean refractive power $PPO_{\alpha,\beta}$ and a module of resulting astigmatism $ASR_{\alpha,\beta}$ for each gaze direction through the lens and corresponding to a lowering angle $\alpha$ and an azimuth angle $\beta$ within the cyclopean coordinate system;
  defining a mean refractive power deviation $DPPO_{\alpha,\beta}$ for each gaze direction as:

$$DPPO_{\alpha,\beta}=PPO_{\alpha,\beta}-PPO_{\alpha,\beta meridian},$$

where $PPO_{\alpha,\beta meridian}$ is the mean refractive power on the meridian line (LM) for the same value of the lowering angle $\alpha$ as that of the gaze direction,
  defining a total deviation $P_{\alpha,\beta}$ for each gaze direction as:

$$P_{\alpha,\beta}=m*(DPPO_{\alpha,\beta})^a+n*(ASR_{\alpha,\beta})^b,$$

where m, n, a and b are parameters such that m≥0, n≤0, (m, n)≠(0, 0), 0<a≤2 and 0<b≤2,
  obtaining first width values as angular distances between first and second gaze directions respectively on the nasal and temporal sides of the lens, both first and second gaze directions with lowering angle equal to that of a gaze direction through the fitting cross, and each where the total deviation $P_{\alpha,\beta}$ satisfies:

$$P_{\alpha,\beta}=m*(ADD/8)^a+n*(ADD/4)^b;$$

obtaining second width values as angular distances between third and fourth gaze directions respectively on the nasal and temporal sides of the lens, both third and fourth gaze directions with lowering angle equal to that of the proximate vision gaze direction, and each where the total deviation $P_{\alpha,\beta}$ satisfies:

$$P_{\alpha,\beta}=m*(ADD/4)^a+n*(ADD/2)^b;$$

obtaining a maximum mean refractive power gradient produced for a gaze direction corresponding to a cyclopean gaze direction which is comprised:
  inside a zone centered at the cyclopean gaze direction corresponding to gaze direction passing through the prism reference point and containing all cyclopean gaze directions respecting the following inequality $(|\alpha|^2+|\beta|^2)^{1/2}\leq 40°$, and
  outside a central optical zone, said central optical zone comprising a main line of cyclopean directions for which, for each angle $\alpha_{min}$, the resulting astigmatism reaches its minimum, the central optical zone being delimited on either side of the main line by cyclopean gaze directions whose azimuth angle is equal to $\beta_{min}\pm 5°$;

/3/ for the lens pair:
  defining a total horizontal width ratio as a relative difference between the respective first width values of both lenses of the pair, or between the respective second width values of both lenses of the pair, the relative difference between two values being a ratio of a difference between said values over a sum of said values; and
  defining a relative difference in the maximum mean refractive power gradient between both lenses of the pair;

/4/ optimizing at least one lens of the pair so that the total horizontal width ratio has an absolute value greater than or equal to 0.10, and the relative difference in the maximum mean refractive power gradient between both lenses is less than or equal to 0.08 in absolute value; and /5/ manufacturing both lenses of the pair in accordance with an optimization result of step /4/.

2. Method according to claim 1, in which step /4/ comprises:
  obtaining at least one data linked to the wearer;
  based on said data linked to the wearer, determining one of the wearer's eyes as a main eye or determining a value of a dominance rate for both eyes;
  obtaining a relationship between a modulation parameter for the total horizontal width ratio and said main eye or value of the dominance rate; and
  performing the optimization using the modulation parameter for the total horizontal width ratio.

3. Method according to claim 1, in which step /4/ comprises:
  obtaining target designs respectively for both lenses of the pair;
  based on data linked to the wearer, determining one of the wearer's eyes as a main eye or determining a value of a dominance rate for both eyes;
  obtaining a relationship between a modulation parameter for the total horizontal width ratio and said main eye or value of the dominance rate;
  modifying the target designs using the modulation parameter for the total horizontal width ratio; and
  performing the optimization using the modified target designs.

* * * * *